United States Patent
Okuma (10) Patent No.: US 10,508,477 B2
(45) Date of Patent: Dec. 17, 2019

(54) HANDLE DEVICE AND MANUFACTURING METHOD OF HANDLE DEVICE

(71) Applicant: ALPHA CORPORATION, Yokohama-shi, Kanagawa (JP)

(72) Inventor: Ryoya Okuma, Yokohama (JP)

(73) Assignee: ALPHA CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 16/225,546

(22) Filed: Dec. 19, 2018

(65) Prior Publication Data
US 2019/0119957 A1   Apr. 25, 2019

Related U.S. Application Data

(63) Continuation of application No. PCT/JP2017/024006, filed on Jun. 29, 2017.

(30) Foreign Application Priority Data

Jul. 6, 2016 (JP) .................. 2016-133932

(51) Int. Cl.
*E05B 79/20* (2014.01)
*E05B 79/06* (2014.01)
*E05B 85/16* (2014.01)
*E05B 79/22* (2014.01)

(52) U.S. Cl.
CPC ............. *E05B 79/06* (2013.01); *E05B 79/20* (2013.01); *E05B 85/16* (2013.01); *E05B 79/22* (2013.01)

(58) Field of Classification Search
CPC .......... E05B 79/06; E05B 79/20; E05B 85/16; E05B 79/22
See application file for complete search history.

(56) References Cited

U.S. PATENT DOCUMENTS

2014/0013667 A1   1/2014   Amagai et al.

FOREIGN PATENT DOCUMENTS

| EP | 2602158 A1 | 6/2013 |
| JP | H10-266645 A | 10/1998 |
| JP | H10-274233 A | 10/1998 |
| JP | 2000-87617 A | 3/2000 |
| WO | WO-2012/137558 A1 | 10/2012 |

OTHER PUBLICATIONS

International Search Report dated Aug. 1, 2017 for PCT/JP2017/024006.
International Search Report/Written Opinion dated Aug. 1, 2017 for PCT/JP2017/024006, including partial English translation.

*Primary Examiner* — Vicky A Johnson
(74) *Attorney, Agent, or Firm* — Drinker Biddle & Reath LLP (57) ABSTRACT

A handle device operating an inner cable inserted in an outer cable, the handle device includes a handle base fixing an operation handle to which the inner cable is connected and a cable holding portion provided in the handle base to hold the outer cable and configured to be fitted to a circumferential groove portion reduced in diameter in a radial direction in an outer circumferential surface of the outer cable.

9 Claims, 7 Drawing Sheets

HANDLE DEVICE AND MANUFACTURING METHOD OF HANDLE DEVICE

CROSS REFERENCE TO RELATED APPLICATIONS

This application is a continuation of PCT application No. PCT/JP2017/024006, which was filed on Jun. 29, 2017 based on Japanese Patent Application (No. 2016-133932) filed on Jul. 6, 2016, the contents of which are incorporated herein by reference.

BACKGROUND OF THE INVENTION

Field of the Invention

The present invention relates to a handle device and a manufacturing method of the handle device.

Description of Related Art

Patent document 1 discloses a vehicle door apparatus which includes a handle device which is attached to a door panel of a door body, a lock unit which engages the door body with the vehicle body, and a cable which connects the handle device and the lock unit. In the vehicle door apparatus, the cable includes an inner cable which directly connects the handle device and a latch device of the lock unit, and an outer cable which supports the inner cable to be freely slidable. In an end of the outer cable on a side near the handle device, there is formed a fitting groove which is fitted to a handle base of the handle device. The handle base includes a groove-shaped latch fitting portion. The fitting groove of the outer cable and the latch fitting portion of the handle base are fitted, so that the outer cable is held to the handle base.

[Patent Literature 1] WO-2012/137558

In the handle device, the lock unit of the door with respect to the vehicle body, and the vehicle door apparatus of the patent document 1, variation is caused in the outer diameter depending on a kind (material, or the like) or a manufacturing error when holding the outer cable with the fitting structure. For example, if a dimension of the outer cable is large or the material is rigid, it is necessary to require excessive force for inserting the outer cable into the fitting portion, thereby degrading the insertion property. If the dimension of the outer cable is small or the material is soft, a force for holding (fitting) of the fitting portion with respect to the outer cable is too small, and thus the outer cable may fall off due to the tension of the cable and vibrations of the vehicle.

SUMMARY

According to embodiments of the invention, there is provided a handle device and a manufacturing method of the handle device which can achieve excellent adaptability to a cable.

According to embodiments of the invention, a handle device operating an inner cable inserted in an outer cable is provided. The handle device includes a handle base fixing an operation handle to which the inner cable is connected and a cable holding portion provided in the handle base to hold the outer cable and configured to be fitted to a circumferential groove portion reduced in diameter in a radial direction in an outer circumferential surface of the outer cable. The cable holding portion includes a fitting portion which is configured to be fitted to the circumferential groove portion and to hold the outer cable, and a pair of guide pieces which is provided to face each other to fit into the circumferential groove portion from both sides and which forms an insertion groove guiding the circumferential groove portion into the fitting portion. A first guide piece which is one guide piece of the pair of guide pieces includes a fixing portion. When the circumferential groove portion moves along the insertion groove, the fixing portion is elastically deformed to a direction perpendicular to a plane where the first guide piece extends. When the circumferential groove portion passes the first guide piece, the fixing portion is elastically returned to the direction perpendicular to the plane to be engaged with the outer circumferential surface of the outer cable.

In the handle device, the first guide piece preferably has a boundary between the first guide piece and the fitting portion separated by a gap and the fixing portion is preferably a corner of the first guide piece adjacent to the gap, the corner extending in the direction perpendicular to the plane.

In the handle device according, the handle base preferably includes an opening groove along the corner of the first guide piece to prompt the elastic deformation of the fixing portion.

In the handle device, the fixing portion preferably includes a step portion configured to be locked to a corner portion of the outer cable adjacent to the circumferential groove portion.

In the handle device, a second guide piece which is the other guide piece of the pair of guide pieces preferably includes a flexural deformation portion which is flexibly deformed in a planar direction when the circumferential groove portion moves along the insertion groove to widen a width between the pair of guide pieces.

In the handle device, the handle base preferably includes a slit along a side edge of the second guide piece to prompt flexural deformation of the flexural deformation portion.

In the handle device, the fixing portion of the first guide piece has a deformation characteristic to the direction perpendicular to the plane better than the second guide piece, and the flexural deformation portion of the second guide piece preferably has a deformation characteristic to the planar direction better than the first guide piece.

According to embodiments of the invention, a handle device operating an inner cable inserted in an outer cable is provided. The handle device includes a handle base fixing an operation handle to which the inner cable is connected. A cable holding portion provided in the handle base to hold the outer cable and configured to be fitted to a circumferential groove portion reduced in diameter in a radial direction in an outer circumferential surface of the outer cable. The cable holding portion includes a fitting portion which is configured to be fitted to the circumferential groove portion and to hold the outer cable, and a pair of guide pieces which is provided to face each other to fit into the circumferential groove portion from both sides and which forms an insertion groove guiding the circumferential groove portion into the fitting portion. Any one guide piece of the pair of guide pieces includes a flexural deformation portion which is flexibly deformed in a planar direction when the circumferential groove portion moves along the insertion groove to widen a width between the pair of guide pieces. The handle base includes a slit along a side edge of the one guide piece to prompt flexural deformation of the flexural deformation portion.

According to embodiments of the invention, a manufacturing method of a handle device which operates an inner cable inserted into an outer cable using an operation handle connected to a handle base is provided. The handle device is provided with a cable holding portion in the handle base to fix the outer cable. The cable holding portion includes a fitting portion which is configured to be fitted to a circumferential groove portion reduced in diameter in a radial direction in an outer circumferential surface of the outer cable to hold the outer cable and a pair of guide pieces which is provided to face each other to fit into the circumferential groove portion from both sides and which forms an insertion groove guiding the circumferential groove portion into the fitting portion. One guide piece of the pair of guide pieces which is a first guide piece includes a fixing portion elastically deformable to a direction perpendicular to a plane. The manufacturing method includes inserting the circumferential groove portion into the insertion groove while the pair of guide pieces are fitted to the circumferential groove portion, moving the circumferential groove portion along the insertion groove while elastically deforming the fixing portion to the direction perpendicular to the plane, and causing the circumferential groove portion to pass through the first guide piece to reach the fitting portion, such that the fixing portion elastically returns to the direction perpendicular to the plane to be engaged with the outer circumferential surface of the outer cable.

According to the embodiment of the invention, a manufacturing method of a handle device which operates an inner cable inserted into an outer cable using an operation handle connected to a handle base is provided. The handle device is provided with a cable holding portion in the handle base for fixing the outer cable. The cable holding portion includes a fitting portion to hold the outer cable by fitting with a circumferential groove portion reducible in diameter in a radial direction in an outer circumferential surface of the outer cable, and a pair of guide pieces provided to face each other to fit into the circumferential groove portion from both sides, forming an insertion groove for guiding the circumferential groove portion into the fitting portion. One guide piece of the pair of guide pieces includes a flexural deformation portion flexibly deformable to a planar direction. The manufacturing method of the handle device includes inserting the circumferential groove portion into the insertion groove while the pair of guide pieces are fitted to the circumferential groove portion, and moving the circumferential groove portion along the insertion groove. When the circumferential groove portion is moved along the insertion groove, the flexural deformation portion is flexibly deformed to widen a width between the pair of guide pieces.

According to one or more embodiments, it is possible to provide the handle device and the manufacturing method of the handle device which is excellent in adaptability to a cable.

DETAILED DESCRIPTION

Figure 1:
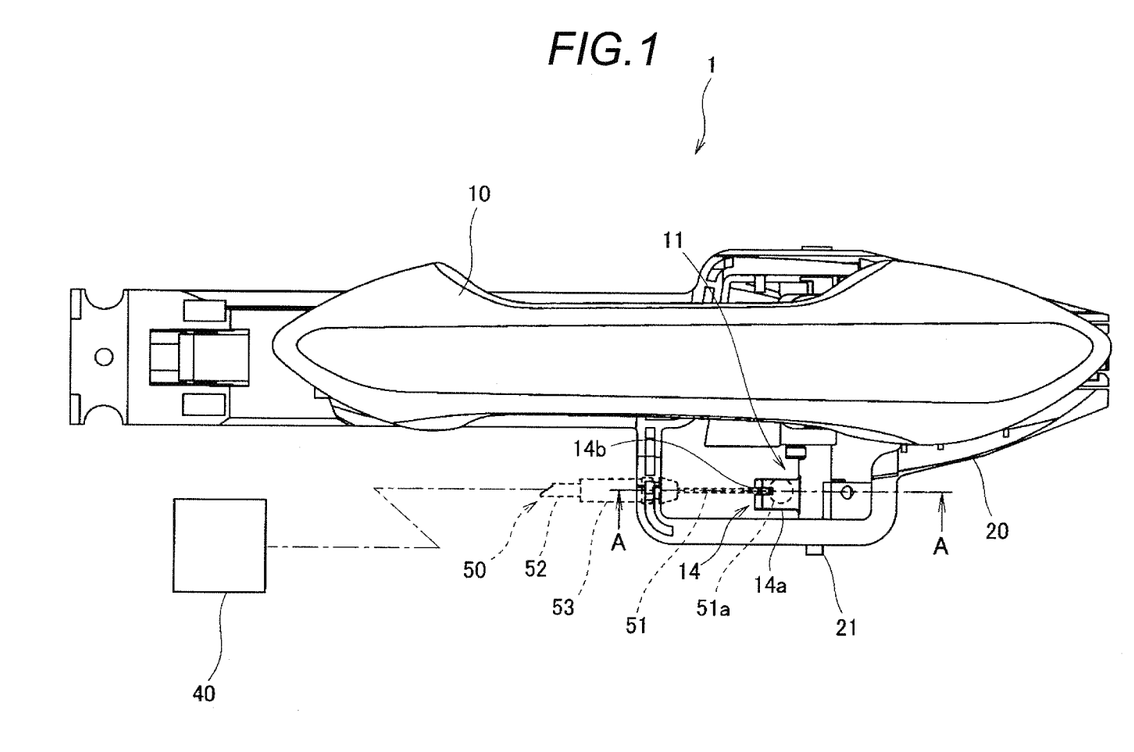
FIG. 1 is a front view schematically illustrating a handle device.
Figure 2:
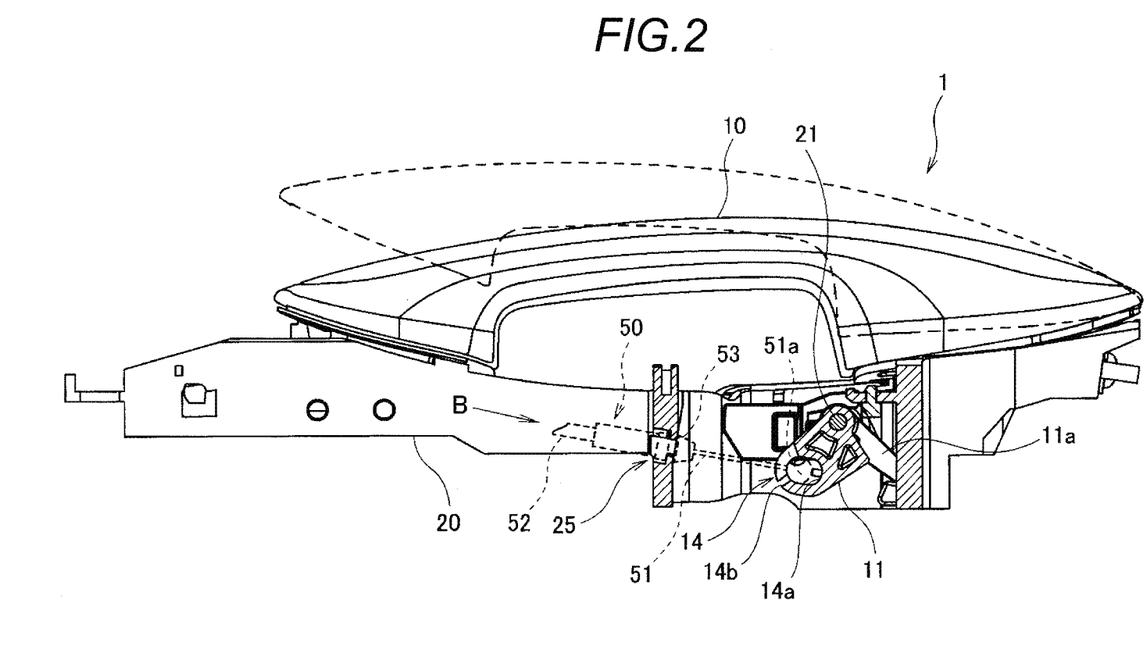
FIG. 2 is a cross-sectional view taken along line AA of the handle device illustrated in FIG. 1.
Figure 3:
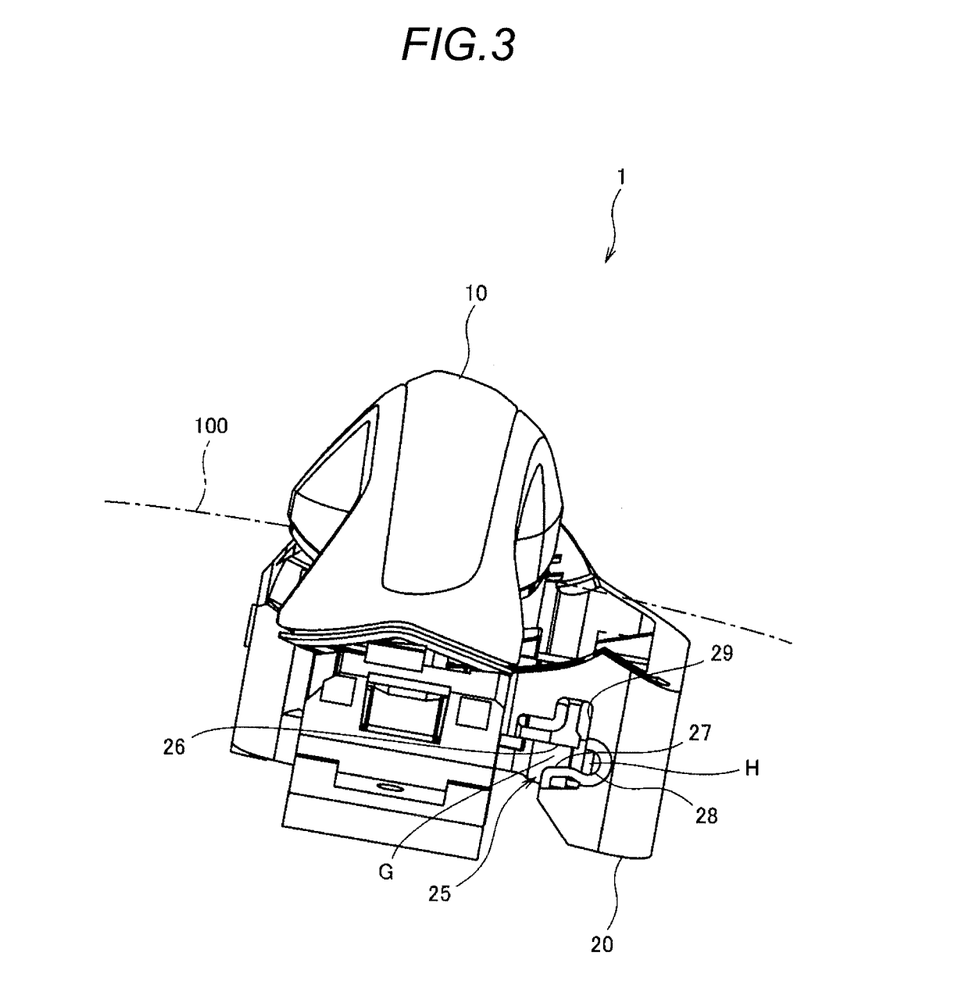
FIG. 3 is a view illustrating the handle device illustrated in FIG. 2 when viewed in a direction of an arrow B.
Figure 4:
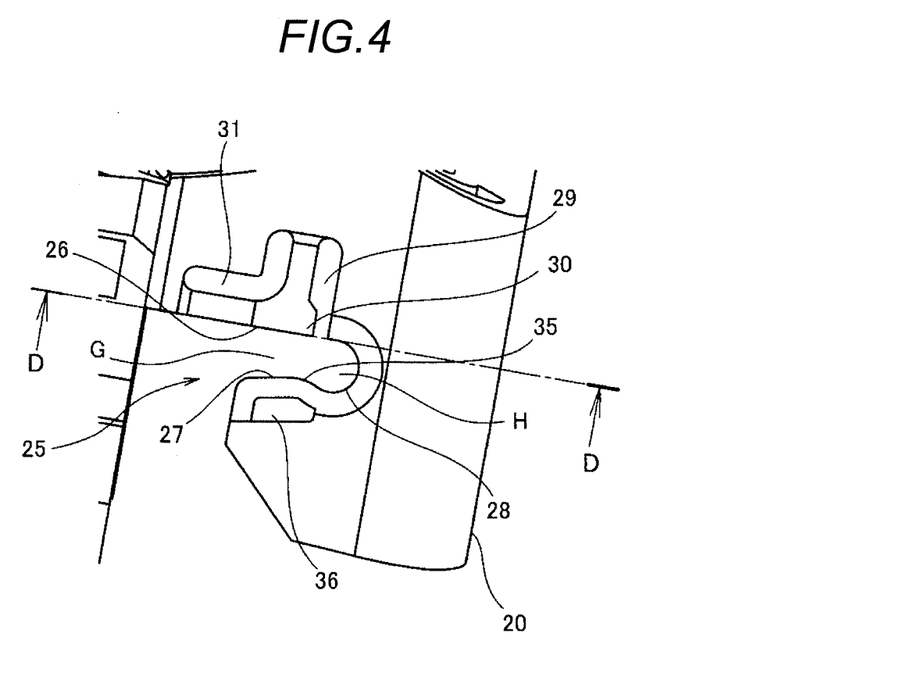
FIG. 4 is an explanation view selecting and illustrating main parts of the handle device illustrated in FIG. 3.
Figure 5:
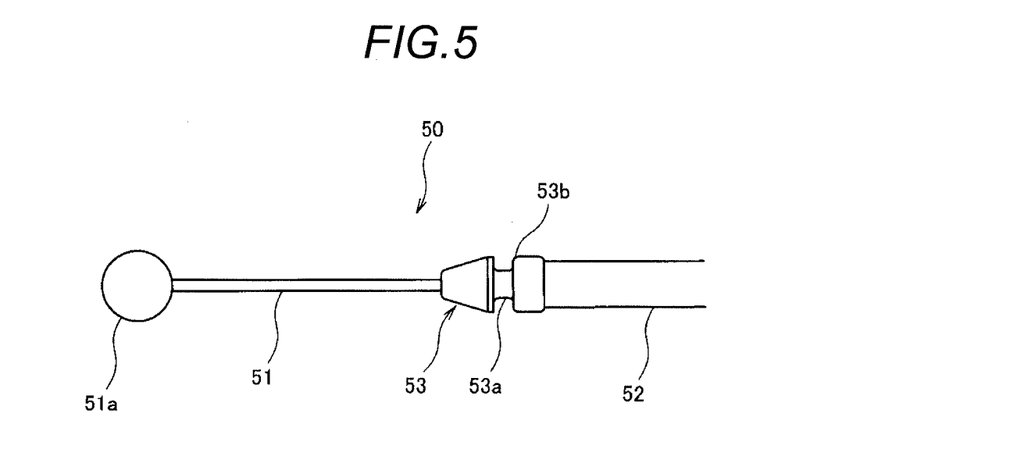
FIG. 5 is an explanation view illustrating main parts of a cable device.

Hereinafter, a handle device 1 applied to a side door of an automobile will be described with reference to the drawings. FIG. 1 is a front view schematically illustrating the handle device 1 according to an embodiment. FIG. 2 is a cross-sectional view taken along line AA of the handle device 1 illustrated in FIG. 1. FIG. 3 is a view illustrating the handle device 1 illustrated in FIG. 2 when viewed in a direction of an arrow B. FIG. 4 is an explanation view selecting and illustrating main parts of the handle device 1 illustrated in FIG. 3. FIG. 5 is an explanation view selecting and illustrating main parts of a cable device 50.

The side door of an automobile includes a door outer panel 100 (see FIG. 3) and a door inner panel (not illustrated). The door outer panel 100 is a metal vehicle body panel which is positioned on the outside of the vehicle in the side door. The side door includes the handle device 1 which is fixed to the door outer panel 100, a lock device 40 which is fixed inside the side door, and the cable device 50 which connects the handle device 1 and the lock device 40.

The handle device 1 according to this embodiment is a device related to an outside handle which is fixed on the outside of the door outer panel 100. The handle device 1 includes an operation handle 10 and a handle base 20 as a main body.

The operation handle 10 is connected to the handle base 20 at one end in a longitudinal direction thereof to be freely rotated. The operation handle 10 is configured to be pivotable between an initial position depicted by a solid line and a pivoting operation position depicted by a chain line (see FIG. 2). The operation handle 10 is pushed toward the initial position by a torsion spring described below. The operation handle 10 is pivoted by grapping and pulling the center portion in a thickness direction of the side door, and reaches the pivoting operation position from the initial position. On the other hand, when the operation handle 10 is released, a force of the torsion spring is received, and the operation handle 10 returns (pivots) to the initial position from the pivoting operation position.

The handle base 20 is fixed to the door outer panel 100, and fixes the operation handle 10 to be freely pivotable.

The operation handle 10 includes a lever member 11. The lever member 11 is connected to be freely rotated about a support shaft 21 of the handle base 20. In the lever member 11, an operation arm 11a is projected. The operation arm 11a is engaged with the operation handle 10. When the operation handle 10 at the initial position operates up to the pivoting operation position, the operation arm 11a is lifted up. Then, the lever member 11 rotates from an initial rotation position to a drive rotation position.

The lever member 11 is pushed toward the initial rotation position by a torsion spring (not illustrated) which is wound around the support shaft 21. A pushing force to be applied to the lever member 11 is transferred to the operation handle 10 through the operation arm 11a. Therefore, the operation handle 10 operated from the initial position goes back to the initial position as the operation force is released.

In addition, the lever member 11 is provided with a slinging portion 14 which connects the cable device 50 (an inner cable 51 described below). As illustrated in FIG. 2, the slinging portion 14 is formed in a cylindrical shape in which a fitting hole 14a is opened in the center portion, and a slit 14b is formed in a crank shape for inserting the inner cable 51 therethrough.

The lock device 40 includes a latch portion which is engaged with the vehicle body to hold the side door in a closed state. The lock device 40 releases the latch portion when an operation force is transferred through the cable device 50.

The cable device 50 is configured such that one end thereof is connected to the handle device 1 and the other end is connected to the lock device 40 so as to connect the handle device 1 and the lock device 40. The cable device 50 includes the inner cable 51 and a tube-shaped outer cable 52. The inner cable 51 is inserted into a hollow portion of the outer cable 52 and can move thereinside.

The outer cable 52 is configured such that one end thereof is fixedly connected to the handle base 20 (a cable holding portion 25 described below) of the handle device 1 and the other end is fixedly connected to a fixing piece of the lock device 40. In other words, the outer cable 52 is held between the handle device 1 and the lock device 40 in a fixed state.

In addition, a sphere terminal tool 51a for locking is fixed to the one end of the inner cable 51. The terminal tool 51a for locking is held by the slinging portion 14 of the lever member 11. Therefore, the one end of the inner cable 51 is connected to the lever member 11. With this configuration, the inner cable 51 and the operation handle 10 are connected through the lever member 11. Similarly, the terminal tool for locking (not illustrated) is also fixed to the other end of the inner cable 51 and connected to a movable point of the lock device 40.

In the side door with such a configuration, the handle device 1 and the lock device 40 are connected through the cable device 50 as described above. When the operation handle 10 is pivoted, the operation arm 11a is lifted up, and the lever member 11 rotates from the initial rotation position up to the drive rotation position. When the lever member 11 rotates from the initial rotation position, since the slinging portion 14 moves relatively, the inner cable 51 is pulled to move in the outer cable 52 toward the handle device 1. With this configuration, the movable point of the lock device 40 is pulled, so that the latch portion holding the side door in a closed state is released. As a result, the side door can be opened.

Hereinafter, a holding structure of the outer cable 52 in the handle device 1 as one of features of this embodiment will be described.

First, the outer cable 52 includes a casing 53 having a substantially columnar shape in the end to be connected to the lock device 40. In the center portion in the axial direction of the casing 53 which forms part of the outer cable 52, a circumferential groove portion 53a is provided which is reduced in diameter in a radial direction in an outer circumferential surface of the casing 53 (the outer cable 52).

Figure 6:
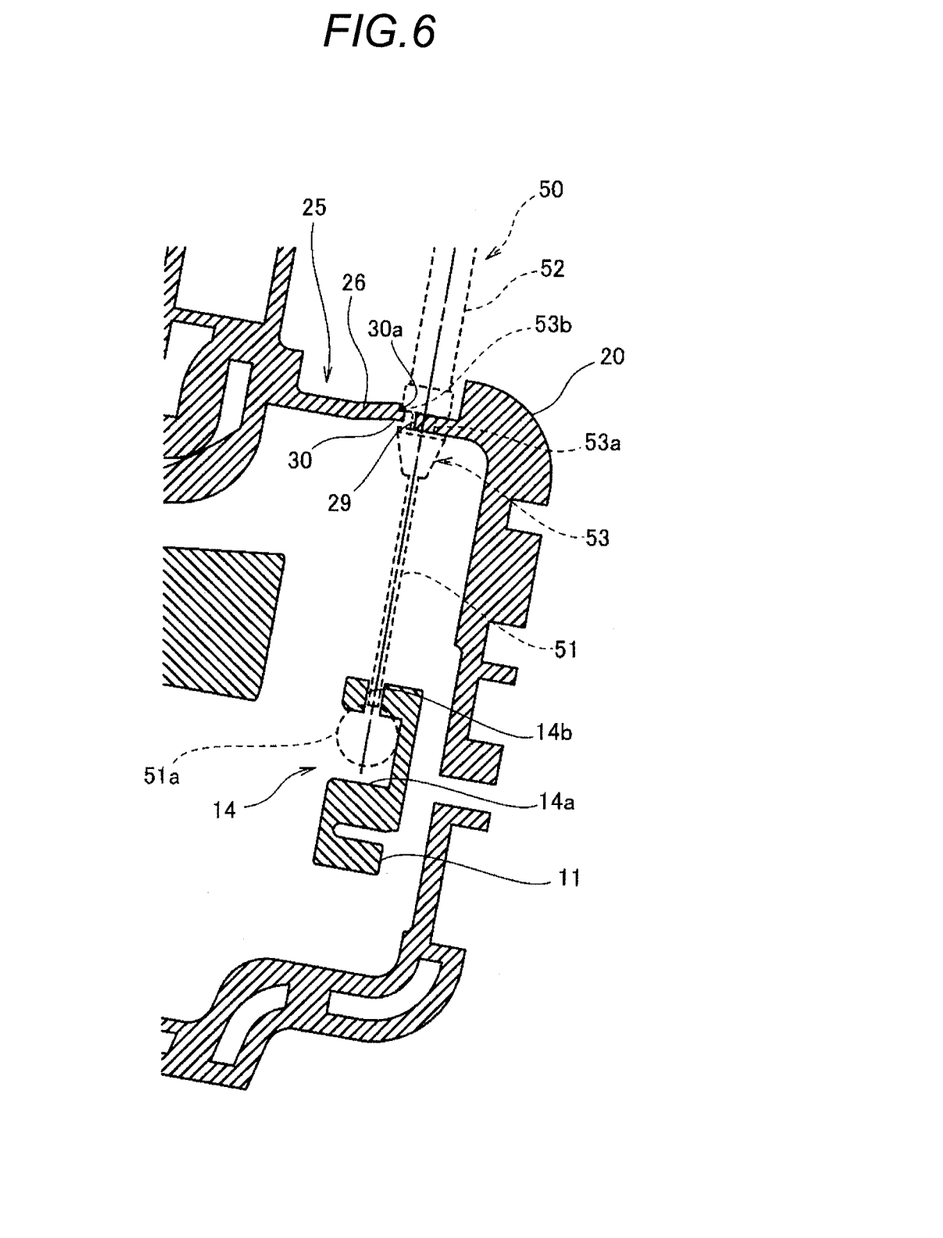
FIG. 6 is a cross-sectional view taken along line DD of the handle device illustrated in FIG. 4.

FIG. 6 is a cross-sectional view taken along line DD of the handle device 1 illustrated in FIG. 4. The handle device 1 includes the cable holding portion 25 which is provided in the handle base 20. The cable holding portion 25 is a groove-shaped portion to hold the outer cable 52 by being fitted to the circumferential groove portion 53a of the outer cable 52. The cable holding portion 25 is formed by partially thinning the handle base 20 in correspondence with the groove width (a width in the axial direction) of the circumferential groove portion 53a. The cable holding portion 25 includes a pair of guide pieces 26 and 27, and a fitting portion 28.

The pair of guide pieces 26 and 27 are disposed to face each other to fit into the circumferential groove portion 53a from the both sides, and form an insertion groove G which guides the circumferential groove portion 53a (that is, the outer cable 52) up to the fitting portion 28. Hereinafter, one guide piece 26 of the pair of guide pieces 26 and 27 is called a first guide piece 26, and the other guide piece 27 is called a second guide piece 27.

Between the pair of guide pieces 26 and 27, the second guide piece 27 is set in a tapered shape to make the insertion hole G widen from the exit side (a side communicated with a holding hole H described below) to the entrance side (an open side). A narrowest portion between the pair of guide pieces 26 and 27 (that is, a portion corresponding to the exit side of the insertion groove G) is set to have a width slightly smaller than a maximum outer diameter (diameter) of the diameter-reduced portion of the circumferential groove portion 53a, and serves to prevent the fall-off of the outer cable 52.

The fitting portion 28 is a portion which is fitted with the circumferential groove portion 53a to hold the outer cable 52. The fitting portion 28 is formed in a substantially arc shape corresponding to the outer shape of the diameter-reduced portion of the circumferential groove portion 53a, and forms the holding hole H which is communicated with the insertion groove G. One end of the fitting portion 28 extends to be connected to a base end (a flexural deformation portion 35 described below) of the second guide piece 27. The other end of the fitting portion 28 is adjacent to the first guide piece 26 with a notch 29 interposed therebetween.

Herein, the fitting portion 28 is set to be in an arc-shape to surround a circumferential range including two points corresponding to the maximum outer diameter (diameter) in the diameter-reduced portion of the circumferential groove portion 53a. According to such a configuration, there is a range not covered by the fitting portion 28, but the diameter-reduced portion of the circumferential groove portion 53a is pressed by the base end (the flexural deformation portion 35 described below) of the second guide piece 27. Therefore, it is prevented that the outer cable 52 falls off. In addition, since the circumferential range including two points of the maximum outer diameter of the circumferential groove portion 53a is surrounded by the fitting portion 28, the outer cable 52 can be held without being loosened.

In the cable holding portion 25 with such a configuration, a fixing portion 30 is provided in the first guide piece 26 by bending a corner adjacent to the notch 29 in a direction perpendicular to a plane. The fixing portion 30 is engaged with the outer circumferential surface of the outer cable 52 (the casing 53) in a state where the circumferential groove portion 53a is fitted to the fitting portion 28. With the engagement, the outer cable 52 is fixed in a state where the circumferential groove portion 53a is fitted to the fitting portion 28. The outer cable 52 is prevented from falling off from the fitting portion 28.

In addition, a step portion 30a is formed in the tip end of the fixing portion 30, and is locked to a corner portion 53b of the casing 53 adjacent to the circumferential groove portion 53a. With this configuration, the outer circumferential surface of the outer cable 52 (the casing 53) and the fixing portion 30 are strongly engaged.

The first guide piece 26 is separated from the fitting portion 28 by the notch 29, and thus the tip end of the fixing portion 30 is a free end. Therefore, since the first guide piece 26 has flexibility, the fixing portion 30 can be elastically deformed in the direction perpendicular to the plane of the first guide piece 26.

In addition, a substantially L-shaped opening groove 31 is provided along a corner of the first guide piece 26. With the opening groove 31, since the first guide piece 26 can be more elastically deformed to the direction perpendicular to the plane, the elastic deformation of the fixing portion 30 is prompted in the direction perpendicular to the plane.

With this configuration, the fixing portion 30 of the first guide piece 26 is structured to have an excellent deformation characteristic to the direction perpendicular to the plane compared to the second guide piece 27. In other words, the second guide piece 27 is set to have higher rigidity relating to the direction perpendicular to the plane compared to the fixing portion 30 of the first guide piece 26.

In this regard, in a side edge of the second guide piece 27, the flexural deformation portion 35 flexibly deformed in a planar direction is provided in the narrowest portion of the pair of guide pieces 26 and 27 (in this embodiment, the base end of the second guide piece 27 from which the fitting portion 28 extends). In the handle base 20, a slit 36 is provided along the side edge of the second guide piece 27. The slit 36 is set to be continuous from the exit side of the insertion groove G to the entrance side at a certain length. With the slit 36, the flexural deformation in the planar direction of the flexural deformation portion 35 is prompted. In other words, the flexural deformation portion 35 is formed in a beam shape with respect to the base portion of the second guide piece 27 through a space formed by the slit 36, and thus the flexural deformation in the planar direction is prompted.

With this configuration, the flexural deformation portion 35 of the second guide piece 27 is structured to have an excellent deformation characteristic to the planar direction compared to the first guide piece 26. In other words, the first guide piece 26 is set to have higher rigidity in the planar direction compared to the flexural deformation portion 35 of the second guide piece 27.

In the cable holding portion 25 with such a configuration, the pair of guide pieces 26 and 27 are fitted into the circumferential groove portion 53a from both sides to move the circumferential groove portion 53a along the insertion groove G. Therefore, the circumferential groove portion 53a can be guided up to the fitting portion 28.

In this case, when the circumferential groove portion 53a moves in the insertion groove G, the pair of guide pieces 26 and 27 enter a state of being interposed from the both sides by the circumferential groove portion 53a. In this case, the circumferential groove portion 53a is moved up to the fitting portion 28 along the insertion groove G, so that the fixing portion 30 and the flexural deformation portion 35 function as described below.

Specifically, when the circumferential groove portion 53a is moved along the insertion groove G, the fixing portion 30 is elastically deformed in the direction perpendicular to the plane by the elastic deformation function to be deformed to a substantially planar state. Next, when the circumferential groove portion 53a passes the first guide piece 26, the fixing portion 30 is away from the circumferential groove portion 53a. Therefore, the fixing portion 30 is elastically returned to the direction perpendicular to the plane. Then, the step portion 30a of the fixing portion 30 is locked to the corner portion 53b of the casing 53 adjacent to the circumferential groove portion 53a. With this configuration, the fixing portion 30 is engaged with the outer circumferential surface of the outer cable 52 (the casing 53), and the fitting state of the fitting portion 28 and the circumferential groove portion 53a is fixed.

In addition, when the circumferential groove portion 53a passes through the exit of the insertion groove G, the pair of guide pieces 26 and 27 are pressed by the diameter-reduced portion of the circumferential groove portion 53a. At this time, the flexural deformation portion 35 is flexibly deformed in the planar direction by the flexural deformation function. Therefore, a width between the pair of guide pieces 26 and 27 is widened. As a result, the circumferential groove portion 53a goes through the narrow portion in the exit of the insertion groove G, and reaches up to the fitting portion 28.

Hereinafter, a manufacturing method of the handle device 1 according to this embodiment, particularly a method of connecting the cable device 50 to the handle device 1, will be described.

The connection of the cable device 50 is performed in an order of connecting the inner cable 51 and then connecting the outer cable 52. Specifically, the terminal tool 51a for locking of the inner cable 51 is fitted to the fitting hole 14a, and the inner cable 51 is inserted to the slit 14b so as to connect the inner cable 51 to the slinging portion 14. Thereafter, the casing 53 formed in the leading end of the outer cable 52 is assembled to the cable holding portion 25 which is formed in the handle base 20.

Figure 7A:
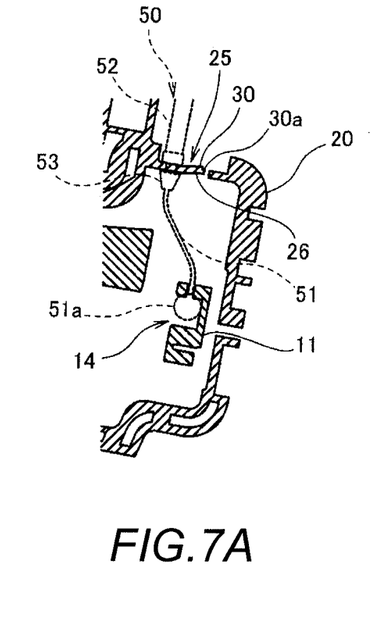
FIGS. 7A to 7C are explanation views illustrating an assembly process of an outer cable with respect to a cable holding portion.
Figure 7B:
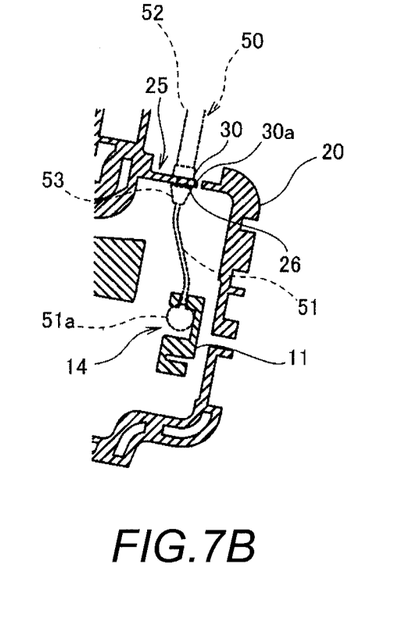
Figure 7C:
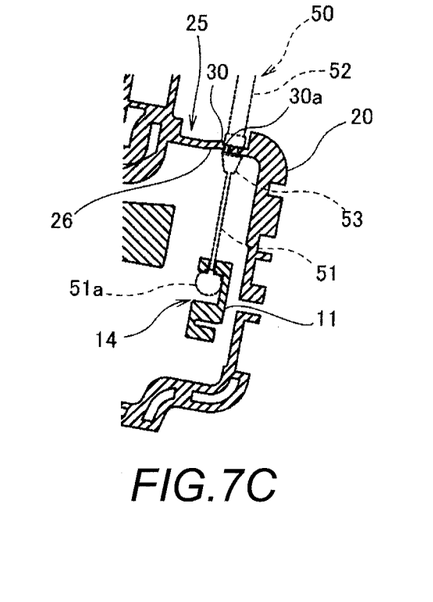
Figure 8A:
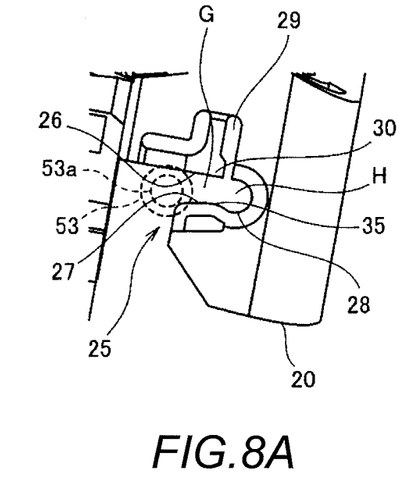
FIGS. 8A to 8C are explanation views illustrating an assembly process of the outer cable with respect to the cable holding portion.

FIGS. 7A to 7C and FIGS. 8A to 8C are explanation views illustrating an assembly process of the outer cable 52 to the cable holding portion 25. First, the casing 53 is disposed on the entrance side of the insertion groove G. Then, while the pair of guide pieces 26 and 27 are fitted to the circumferential groove portion 53a from the both sides, the circumferential groove portion 53a is inserted to the insertion groove G (FIGS. 7A and 8A).

Figure 8B:
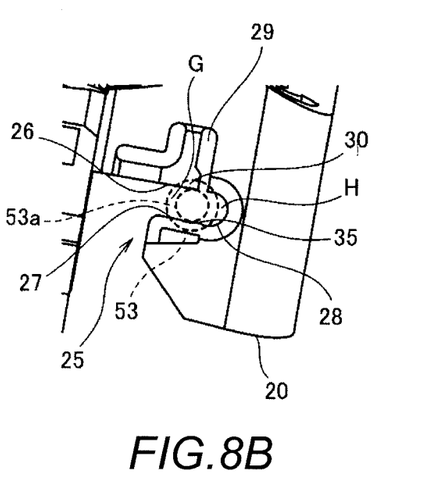

Next, the circumferential groove portion 53a is moved along the insertion groove G. At this time, while the fixing portion 30 of the first guide piece 26 is elastically deformed to the direction perpendicular to the plane, the circumferential groove portion 53a is moved along the insertion groove G (FIG. 7B). Besides, when the circumferential groove portion 53a approaches the exit side of the insertion groove G, the flexural deformation portion 35 is flexibly deformed in the planar direction by the circumferential groove portion 53a, and the width between the pair of guide pieces 26 and 27 is widened (FIG. 8B).

Figure 8C:
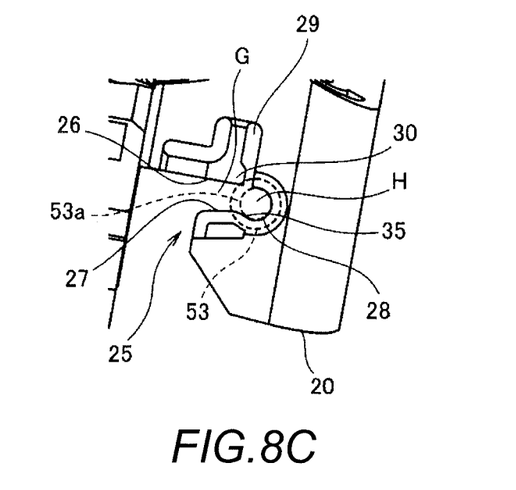

Then, the circumferential groove portion 53a goes through the exit of the insertion groove G, and the circumferential groove portion 53a is fitted to the fitting portion 28. At this time, when the circumferential groove portion 53a passes through the first guide piece 26, since the fixing portion 30 is away from the circumferential groove portion 53a, the fixing portion 30 is elastically returned to the direction perpendicular to the plane. In process of elastic returning, the step portion 30a is locked to the corner portion 53b of the casing 53 (FIGS. 7C and 8C). Accordingly, the fixing portion 30 is engaged with the outer circumferential surface of the outer cable 52.

With the above process, the circumferential groove portion 53a is fitted to the fitting portion 28, and the outer cable 52 is fixed. In this case, after the circumferential groove portion 53a passes through the fitting portion 28, the flexural deformation portion 35 is elastically returned. Therefore, the exit side of the insertion groove G becomes narrow, and the circumferential groove portion 53a can be prevented from falling off from the fitting portion 28. In addition, the fixing portion 30 is locked to the outer circumferential surface of the outer cable 52 (the casing 53), and thus the fitting state of the fitting portion 28 and the circumferential groove portion 53a is fixed.

In this way, the handle device 1 according to this embodiment is a device which operates the inner cable 51 inserted into the outer cable 52, and operates the lock device 40 through the operation of the inner cable 51. The handle device 1 includes the handle base 20 which fixes the operation handle 10 to be connected with the inner cable 51, and the cable holding portion 25 which is provided in the handle base 20 to hold the outer cable 52 and is fitted to the circumferential groove portion 53a reduced in diameter in the radial direction in the outer circumferential surface of the outer cable 52.

Herein, the cable holding portion 25 includes the fitting portion 28 which is fitted with the circumferential groove portion 53a to hold the outer cable 52, and the pair of guide pieces 26 and 27 which are provided to face each other to fit into the circumferential groove portion 53a from both sides and form the insertion groove G to guide the circumferential groove portion 53a up to the fitting portion 28. Then, the first guide piece 26 (one of the pair of guide pieces 26 and 27) includes the fixing portion 30 which is elastically deformed to the direction perpendicular to the plane when the circumferential groove portion 53a moves along the insertion groove G and elastically returned to the direction perpendicular to the plane when the circumferential groove portion 53a goes through the first guide piece 26 so as to be engaged with the outer circumferential surface of the outer cable 52.

According to the configuration, since the fixing portion 30 is in a state of being engaged with the outer circumferential surface of the outer cable 52 (the casing 53), the fitting state of the fitting portion 28 and the circumferential groove portion 53a can be fixed from the outside. With this configuration, as described such that the outer cable 52 is small in dimension, the circumferential groove portion 53a is fixed to the fitting portion 28 even in a situation that a force of the fitting portion 28 to hold the outer cable 52 is small. As a result, it is possible to prevent a defect that the outer cable 52 falls off due to the tension of the cable device 50 or vibrations inputted from the vehicle. Therefore, it is possible to provide the handle device 1 which is excellent in adaptability with respect to the outer cable 52.

In the handle device of the related art, the outer cable 52 is to be held by the narrow portion (width-narrowed portion) of the guide pieces 26 and 27 without causing the guide pieces 26 and 27 to be actively elastically deformed. In this case, the insertion force when the outer cable 52 is inserted to the fitting portion 28 and a force when the outer cable 52 falls off from the fitting portion 28 become equal. When the assembly performance with respect to the fitting portion 28 is improved, the holding performance on the outer cable 52 deteriorates. When the holding force of the piece or the outer cable 52 is increased, the assembly performance with respect to the fitting portion 28 deteriorates. In this way, in the handle device of the related art, it is hardly to achieve the adaptability to the outer cable 52. Therefore, it was necessary to add an extra fixing member to fix the outer cable 52 to achieve both the assembly performance and the holding performance.

However, according to the first guide piece 26 of this embodiment, the fixing portion 30 is engaged with the outer circumferential surface of the outer cable 52 using the force of the first guide piece 26 itself to be elastically returned (elastic deformation). Therefore, the outer cable 52 can be securely held with a simple configuration without adding a new component to fix the outer cable 52 to the fitting portion 28.

In addition, according to the handle device 1 of the embodiment, the entrance side of the insertion groove G faces the opposite side to the door outer panel 100 to be opened. When the entrance side of the insertion groove G faces the door outer panel 100 to be closed, the outer cable 52 may be received by the door outer panel 100 even if the outer cable 52 is away from the fitting portion 28 to remain in the cable holding portion 25. However, according to the handle device 1 of the embodiment, when the outer cable 52 is away from the fitting portion 28, the outer cable 52 may easily fall off from the cable holding portion 25 from the entrance side of the insertion groove G. In this regard, the fixing portion 30 is present according to the embodiment, so that it is possible to fix the fitting state of the fitting portion 28 and the circumferential groove portion 53a. Accordingly, the outer cable 52 can be prevented from falling off from the cable holding portion 25.

In addition, in this embodiment, the boundary of the first guide piece 26 with respect to the fitting portion 28 is separated by the notch 29. The fixing portion 30 is configured such that the corner of the first guide piece 26 adjacent to the notch 29 is bent in the direction perpendicular to the plane.

According to the configuration, the corner of the first guide piece 26 can function as the fixing portion 30. Therefore, the outer cable 52 can be securely held with a simple configuration without adding a new component to fix the outer cable 52 to the fitting portion 28.

Further, in this embodiment, the boundary with the fitting portion 28 is separated by the notch 29. Therefore, the tip end of the fixing portion 30 is a free end. However, the boundary with the fitting portion 28 may be separated by a gap, and any configuration may be employed without being limited to the notch 29.

In addition, in this embodiment, the substantially L-shaped opening groove 31 is set along the corner of the first guide piece 26 in the handle base 20 to prompt the elastic deformation of the fixing portion 30.

According to the configuration, the elastic deformation of the fixing portion 30 is prompted by the opening groove 31, so that the flexibility can be secured. With this configuration, the fixing portion 30 of the first guide piece 26 is structured to have an excellent deformation characteristic to the direction perpendicular to the plane compared to the second guide piece 27. As a result, it is possible that the fixing portion 30 is appropriately elastically deformed as the circumferential groove portion 53a slides.

In addition, in this embodiment, the fixing portion 30 includes the step portion 30a which is locked to the corner portion 53b of the casing 53 adjacent to the circumferential groove portion 53a.

According to the configuration, the step portion 30a is locked to the corner portion 53b of the casing 53 in process of elastically returning of the fixing portion 30. With this configuration, the fixing portion 30 is strongly engaged with the outer circumferential surface of the casing 53, so that the outer cable 52 can be securely held.

In addition, in this embodiment, the second guide piece 27 includes the flexural deformation portion 35 which is flexibly deformed to the planar direction when the circumferential groove portion 53a moves along the insertion groove G to widen a width between the pair of guide pieces 26 and 27.

According to the configuration, when the circumferential groove portion 53a goes through the insertion groove G, the width between the pair of guide pieces 26 and 27 is widened. Therefore, even when the dimension of the outer cable 52 is large, or the material of the outer cable 52 is rigid, it is possible to obtain an excellent insertion property without excessive force when the circumferential groove portion 53a is inserted to the fitting portion 28. As a result, it is possible to provide the handle device 1 which is excellent in adaptability to the outer cable 52.

In addition, after the circumferential groove portion 53a passes through the insertion groove G, the flexural deformation portion 35 is elastically returned. Accordingly, the flexural deformation portion 35 abuts on the circumferential groove portion 53a to prevent the falling-off. Therefore, it is possible to prevent that the circumferential groove portion 53a falls off from the fitting portion 28.

In the handle device of the related art, the outer cable 52 is held by the narrow portion (width-narrowed portion) of the guide pieces 26 and 27 without causing the guide pieces 26 and 27 to be actively elastically deformed. In this case, the insertion force when the outer cable 52 is inserted to the fitting portion 28 and a force when the outer cable 52 falls off from the fitting portion 28 become equal. Therefore, when the assembly performance with respect to the fitting portion 28 is improved, the holding performance on the outer cable 52 deteriorates. When the holding force of the piece or the outer cable 52 is increased, the assembly performance with respect to the fitting portion 28 deteriorates. In the handle device of the related art, it is hardly to achieve the adaptability to the outer cable 52. Therefore, it is necessary to add an extra fixing member to fix the outer cable 52 to achieve both the assembly performance and the holding performance.

However, according to this embodiment, the second guide piece 27 includes the flexural deformation portion 35, and the flexural deformation portion 35 is actively flexibly deformed (elastically deformed). Therefore, it is possible to achieve the adaptability to the outer cable 52. With this configuration, the outer cable 52 can be securely held with a simple configuration.

In addition, in this embodiment, the flexural deformation portion 35 is set to correspond to at least a portion where the width between the pair of guide pieces 26 and 27 is narrowed most.

According to the configuration, when the circumferential groove portion 53a goes through the insertion groove G, the narrowest portion between the pair of guide pieces 26 and 27 is widened. Therefore, even when the dimension of the outer cable 52 is large, or the material of the outer cable 52 is rigid, it is possible to obtain an excellent insertion property without excessive force when the circumferential groove portion 53a is inserted to the fitting portion 28. As a result, it is possible to provide the handle device 1 which is excellent in adaptability to the outer cable 52.

In this embodiment, the slit 36 is set in the handle base 20 along the edge of the second guide piece 27 to prompt the flexural deformation of the flexural deformation portion 35.

According to the configuration, the flexural deformation portion 35 of the second guide piece 27 is structured to have an excellent deformation characteristic to the planar direction compared to the first guide piece 26. Therefore, the flexible deformation to the planar direction can be made appropriately, so that it is possible to obtain an excellent insertion property.

In addition, in this embodiment, the slit 36 is continuously set from the exit side of the insertion groove G to the entrance side.

For example, the handle base 20 is formed by molding using a synthetic resin. Accordingly, the slit 36 is set not only on the exit side where the width is narrow in the insertion groove G but also on the entrance side, so that the entire region of the second guide piece 27 is flexibly bent. With this configuration, it is possible to effectively bend the flexural deformation portion 35 without being hindered due to the resin rigidity. Therefore, it is possible to obtain an excellent insertion property.

Hitherto, the handle device according to the embodiment has been described by being applied to the outside handle of the side door of the automobile. However, the invention is not limited to the above embodiment, and it is a matter of course that various modifications can be made within the scope of the invention. For example, the handle device may be applied to an inside handle to be disposed in the interior of the side door of the automobile. In addition, the handle device may be applied to an operation handle (including an operation lever) in various portions such as a back door. In addition, the handle device may be applied to any vehicle other than an automobile.

Further, the fixing portion and the flexural deformation portion applied to the cable holding portion in the handle device each function as part of the invention. Therefore, the cable holding portion may include only one of the fixing portion and the flexural deformation portion in addition to a case of including both of them. In addition, a manufacturing method of the handle device which includes a cable holding portion to which any one or both of the fixing portion and the flexural deformation portion is applied also functions as part of the invention.

DESCRIPTION OF REFERENCE NUMERALS AND SIGNS

1: handle device
10: operation handle
11: lever member
14: slinging portion
20: handle base
21: support shaft
25: cable holding portion
26: guide piece (first guide piece)
27: guide piece (second guide piece)
28: fitting portion
29: notch
30: fixing portion
30a: step portion
31: opening groove
35: flexural deformation portion
36: slit
40: lock device
50: cable device
51: inner cable
51a: terminal tool for locking
52: outer cable
53: casing
53a: circumferential groove portion
100: door outer panel

What is claimed is:
1. A handle device operating an inner cable inserted in an outer cable, the handle device comprising:
a handle base fixing an operation handle to which the inner cable is connected; and a cable holding portion provided in the handle base to hold the outer cable and configured to be fitted to a circumferential groove portion reduced in diameter in a radial direction in an outer circumferential surface of the outer cable, wherein the cable holding portion includes a fitting portion which is configured to be fitted to the circumferential groove portion and to hold the outer cable, and a pair of guide pieces which is provided to face each other to fit into the circumferential groove portion from both sides and which forms an insertion groove guiding the circumferential groove portion into the fitting portion, wherein a first guide piece which is one guide piece of the pair of guide pieces includes a fixing portion, wherein when the circumferential groove portion moves along the insertion groove, the fixing portion is elastically deformed to a direction perpendicular to a plane where the first guide piece extends, and wherein when the circumferential groove portion passes the first guide piece, the fixing portion is elastically returned to the direction perpendicular to the plane to be engaged with the outer circumferential surface of the outer cable.

2. The handle device according to claim 1,
wherein the first guide piece has a boundary between the first guide piece and the fitting portion separated by a gap, and
wherein the fixing portion is a corner of the first guide piece adjacent to the gap, the corner extending in the direction perpendicular to the plane.

3. The handle device according to claim 2,
wherein the handle base includes an opening groove along the corner of the first guide piece to prompt the elastic deformation of the fixing portion.

4. The handle device according to claim 1,
wherein the fixing portion includes a step portion configured to be locked to a corner portion of the outer cable adjacent to the circumferential groove portion.

5. The handle device according to claim 1,
wherein a second guide piece which is the other guide piece of the pair of guide pieces includes a flexural deformation portion which is flexibly deformed in a planar direction when the circumferential groove portion moves along the insertion groove to widen a width between the pair of guide pieces.

6. The handle device according to claim 5,
wherein the handle base includes a slit along a side edge of the second guide piece to prompt flexural deformation of the flexural deformation portion.

7. The handle device according to claim 5,
wherein the fixing portion of the first guide piece has a deformation characteristic to the direction perpendicular to the plane better than the second guide piece, and
wherein the flexural deformation portion of the second guide piece has a deformation characteristic to the planar direction better than the first guide piece.

8. A handle device operating an inner cable inserted in an outer cable, the handle device comprising:
a handle base fixing an operation handle to which the inner cable is connected; and
a cable holding portion provided in the handle base to hold the outer cable and configured to be fitted to a circumferential groove portion reduced in diameter in a radial direction in an outer circumferential surface of the outer cable,
wherein the cable holding portion includes a fitting portion which is configured to be fitted to the circumferential groove portion and to hold the outer cable, and a pair of guide pieces which is provided to face each other to fit into the circumferential groove portion from both sides and which forms an insertion groove guiding the circumferential groove portion into the fitting portion,
wherein any one guide piece of the pair of guide pieces includes a flexural deformation portion which is flexibly deformed in a planar direction when the circumferential groove portion moves along the insertion groove to widen a width between the pair of guide pieces, and
wherein the handle base includes a slit along a side edge of the one guide piece to prompt flexural deformation of the flexural deformation portion.

9. A manufacturing method of a handle device which operates an inner cable inserted into an outer cable using an operation handle connected to a handle base, the handle device provided with a cable holding portion in the handle base to fix the outer cable, the cable holding portion including a fitting portion which is configured to be fitted to a circumferential groove portion reduced in diameter in a radial direction in an outer circumferential surface of the outer cable to hold the outer cable and a pair of guide pieces which is provided to face each other to fit into the circumferential groove portion from both sides and which forms an insertion groove guiding the circumferential groove portion into the fitting portion, and one guide piece of the pair of guide pieces which is a first guide piece including a fixing portion elastically deformable to a direction perpendicular to a plane where the first guide piece extends, the manufacturing method comprising:
inserting the circumferential groove portion into the insertion groove while the pair of guide pieces are fitted to the circumferential groove portion;
elastically deforming the fixing portion to the direction perpendicular to the plane and moving the circumferential groove portion along the insertion groove; and
causing the circumferential groove portion to pass through the first guide piece to reach the fitting portion, so that the fixing portion elastically returns to the direction perpendicular to the plane to be engaged with the outer circumferential surface of the outer cable.

* * * * *